United States Patent Office 3,486,881
Patented Dec. 30, 1969

3,486,881
PREPARATION OF COBALT/TUNGSTEN CARBIDE MIXTURES
Geoffrey W. Meadows, Kennett Square, Pa., assignor to E. I. du Pont de Nemours and Company, Wilmington, Del., a corporation of Delaware
No Drawing. Filed Apr. 10, 1967, Ser. No. 629,428
Int. Cl. B22f 1/00
U.S. Cl. 75—.5                                  5 Claims

ABSTRACT OF THE DISCLOSURE

Preparation of intimate mixtures of cobalt and tungsten carbide by preparing tungsten carbide in a fused salt reaction in the presence of cobalt metal or its reducible precursor such that the cobalt and tungsten carbide are precipitated in intimate and homogeneous admixture.

A typical reaction involves adding metallic calicum to a suspension of a tungsten source such as tungsten oxide and a cobalt source such as cobalt oxide in a molten salt such as calcium chloride containing suspended carbon stoichiometrically sufficient to react with the tungsten to form tungsten carbide, and precipitating an intimate homogeneous mixture of cobalt and tungsten carbide.

Background of the invention

This invention relates to a method of preparing cobalt/tungsten carbide mixtures. The usual process for preparing intimately mixed cobalt and tungsten carbide is to separately prepare tungsten carbide powder and cobalt metal powder and grind these together in a ball-mill until the cobalt is well distributed in and upon the tungsten carbide grains. Unless the ballmilling is extensive the distribution of cobalt is uneven and the resulting powder is not suitable for uses requiring extreme homogeneity such as preparation of cobalt/tungsten carbide refractories and cutting tools by heating and densifying the powder mixtures. Moreover the preparation of the powder mixture by the usual process requires separate facilities for the preparation of each of the cobalt powder and the tungsten carbide powder and then an additional step of milling the two together and recovering and drying the milled mixtures.

Some methods have been proposed for avoiding the expense and inconvenience of the usual procedure such as depositing the cobalt as a halide on the tungsten carbide grains in the manner disclosed in U.S. Patent No. 3,157,497. However such a procedure still involves several steps and avoids only the final ballmilling requirement of the usual procedure. Another method of preparing the mixed cobalt, tungsten carbide powder is disclosed in U.S. Patent No. 1,812,811 but it avoids none of the expense or inconvenience of the usual procedure.

The method disclosed in U.S. Patent No. 1,874,641 would appear to avoid many of the unsatisfactory aspects of the usual procedure however still contains several disadvantages. The preparation of the mixed powder as disclosed in U.S. Patent No. 1,874,641 calls for reducing and carburizing cobalt and tungsten either as a chemical combination or as a mixture. However, as the reduction and carburization are carried out on the components alone there is a tendency to reduce the cobalt source to cobalt metal and the tungsten source to tungsten metal with attendant phase separation before carburizing of the tungsten begins. As a result of the phase separation the intimacy of mixture and the homogeneity of the resulting powder is limited.

I have discovered a method for preparing a pulverulent powder mixture of cobalt and tungsten carbide comprising making tungsten carbide in a fused salt medium in the presence of cobalt or a reducible source of cobalt. By this method the cost and inconvenience of the separate steps of the usual process is avoided while a truly intimate homogeneous mixture of cobalt and tungsten carbide is obtained. Thus observation of the products of this process with an electron microscope surprisingly reveals only one apparent phase rather than observable tungsten carbide and cobalt phases.

Summary

In summary this invention is directed to an improvement in the preparation of pulverulent mixtures of cobalt and tungsten carbide wherein the tungsten carbide is prepared in a fused salt reaction by reducing a source of tungsten with metallic calcium in a molten calcium chloride medium in the presence of a sufficient amount of carbon to react with the tungsten to form tungsten carbide; the improvement comprising admixing with the molten medium a source of cobalt, and recovering the intimate cobalt/tungsten carbide precipitate.

The intimate cobalt/tungsten carbide powder produced by the process of this invention is suitable for the variety of uses known to the art for a mixture of these components. However, the powder products of this invention are most notably useful in preparing by hot-pressing, extremely strong, extremely hard compacts suitable for use as cutting tools.

Description of the preferred embodiments

*Reactants.*—The reactants suitable for use in this invention are a source of carbon and sources of tungsten and cobalt which are reduced to their metal state under the conditions of the fused salt reaction.

Suitable tungsten compounds include cobalt tungstate or cobalt para tungstate which can be prepared by the method disclosed in U.S. Patent No. 1,874,641. Other suitable tungsten compounds include tungstic oxide and compounds which decompose on heating to yield tungstic oxide such as tungstic acid, and its salts including calcium tungstate and the above mentioned cobalt tungstate. Other tungsten compounds suitable for use in this invention such as tungsten chlorides will be apparent to those skilled in the art. Finely divided tungsten metal can be used as a source of tungsten but its reaction with carbon at temperatures around 1000° C. is inconveniently slow. The preferred sources of tungsten are tungsten oxide, cobalt tungstate and cobalt para tungstate with the latter two compounds being most preferred for reasons of convenience. For the purposes of this invention the term "tungsten source" is meant to include all of the above suitable tungsten compounds as well as others readily apparent to those skilled in the art.

Suitable "cobalt sources" include those mentioned above, cobalt metal, cobalt oxide, and compounds which decompose to cobalt oxides at temperatures in the range of 1000° C. Representative of such compounds are cobalt carbonate and cobalt formate. Compounds of cobalt which are reduced to cobalt metal under the conditions of the reaction which do not fall into the above class include cobalt sulfide and cobalt chloride. However the latter type compounds are not preferred because of the possibility that their reduction will leave residual impurities in the product.

The preferred cobalt sources are cobalt metal, cobalt oxide, cobalt tungstate and cobalt para tungstate with the latter two compounds being most preferred for reasons of convenience.

Materials which decompose thermally under the conditions of this reaction to yield finely divided carbon are suitable for use as a "carbon source" in the processes of this invention. Calcium carbide furnishes a carbon source as well as a reducing action due to the calcium. However, since different amounts of calcium and carbon are required for the process it is ordinarily preferred to add them separately rather than in chemical combination. Finely divided carbon in the form of carbon black is the preferred source of carbon for use in the process of this invention. Such a form makes the carbon readily available and introduces no foreign materials into the reaction.

Metallic calcium is preferred for use as the reducing agent for reasons of economy and convenience although other reducing agents can be used if desired, some with attendant disadvantages. Thus gaseous hydrogen can be used as a reducing agent but its introduction and dispersion in the molten salt bath poses a mechanical problem. In addition, use of hydrogen presents some problem as an explosion hazard in the off-gas and tends to convert finely divided carbon to a hydrocarbon such as methane at the elevated temperatures of reaction.

The fused salt medium can be any salt which offers a convenient medium for the reaction at a temperature in the range of 1000° C. Ordinarily the reaction will be conducted in a medium of molten calcium chloride as it is the most preferred medium. Other salts which can be used include sodium and potassium chloride, but both of these salts lead to the formation of some volatile sodium or potassium vapors creating a potential fire hazard. Similarly, lithium chloride can be used as the reaction medium but is much more expensive than calcium chloride and does not demonstrate compensating advantages.

*Reaction conditions.*—The reaction conditions suitable for use in this invention are generally those disclosed in copending application Ser. No. 250,442, filed Jan. 9, 1963 now abandoned, as suitable for preparation of tungsten carbide in a fused salt reaction.

The order of addition of the reactants is not critical and the cobalt source can be added to the molten medium before, during or after the formation of tungsten carbide. It is most convenient and a preferred embodiment of this invention to add the cobalt simultaneously with the tungsten such as in the form of intimately mixed oxides or as a compound such as cobalt tungstate or cobalt para tungstate. Along with addition of the cobalt source and tungsten source the carbon source is also added in a preferred embodiment of this invention. Thus the carbon can be added as carbon black simultaneously with the metal sources in an amount stoichiometrically required to convert the tungsten to tungsten carbide.

By the above procedure the intimacy of distribution of cobalt and tungsten in the molten medium is optimized and maximum intermixing of cobalt metal and tungsten carbide results.

The amount of cobalt source used will be determined by the product desired and the use to which the product will be put. Cobalt content of the product will ordinarily range from about 1 to 30% based on the weight of cobalt and tungsten carbide. Higher percentages of cobalt, up to 60% or 70% can be prepared by the processes of this invention if such a product is desired. It is preferred to prepare a composition containing from about 1 to 15% of cobalt as with larger or smaller amounts it is more difficult to control the process so as to avoid sintering and aggregation and to avoid formation in one portion of the molten medium a concentration rich in one or the other of cobalt or tungsten carbide.

The product is recovered from the reactor by the procedures disclosed in the above mentioned copending application Serial No. 250,442. After washing the product to free it of the salt used as a reaction medium, and any other water-soluble impurities which may be present, the product is dried to yield a free-flowing finely divided black powder. This powder can be converted by conventional powder metallurgical procedures to refractory compositions including carbide cutting tool material. For convenience and efficiency of use in such conventional methods the powder can if desired be treated in a manner to make it more suitable for its intended use. Thus it can be densified by conventional methods, tumbled or ballmilled for brief periods, or mixed with wax binders to prepare free-flowing pellets.

The following examples as well as those above are intended to be merely illustrative of the invention. Parts and percentages in the following are bp weight unless otherwise specified.

Example 1

This example describes the preparation of an intimate pulverulent particulate mixture of tungsten carbide and cobalt.

Solutions consisting of 930 parts of tungstic oxide dissolved in 2500 parts of 31% ammonium hydroxide and 125 parts of cobalt nitrate dissolved in 500 parts of water are added simultaneously with vigorous stirring to 2400 parts of 35% nitric acid, maintaining the pH below one throughout by the further addition of 1200 parts of 70% nitric acid. The pH is finally adjusted to 7.2 by the addition of 1080 parts of 31% ammonium hydroxide, with continued stirring. The buff colored precipitated solid is recovered by filtering, washing until the filtrate is clear and colorless and drying in an air oven at 100–110° C. 926 parts of solid are obtained and this material is then fired at 800° C. in a muffle furnace to give 848 parts of powder which is found by analysis to correspond to 94.0% tungstic oxide and 5.50% cobaltic oxide.

One thousand parts of calcium chloride are melted and brought to 980° C. in a carbon crucible, maintaining an atmosphere of argon in the system. To the melt, continuously agitated with a carbon stirrer, are added, simultaneously through separate charging ports attached to the head of the reactor (a) 26.1 parts of a blended mixture consisting of 24.7 parts of the tungstic oxide-cobaltic oxide powder prepared as described above and 1.4 parts of fine carbon having a specific surface area of 340 square meters per gram, previously fired for 4 hours at 750° C. under argon to remove water, and (b) 13.3 parts of pure granulated calcium metal. Each of the materials (a) and (b) are charged in ten increments at four minute intervals over a period of forty minutes, the temperature being maintained in the range between 980–995° C. After the addition of all the reactants the melt is maintained at temperature with stirring for a further twenty minutes and is then drained from the carbon crucible into an Inconel bucket. The melt is then allowed to solidify and cool. The atmosphere of argon is maintained over the reactants throughout the above procedure.

One thousand, one hundred and twenty-five parts of solid cake are recovered, crushed to pass through a ten mesh screen and added slowly to 2000 parts of ice water with stirring and simultaneous addition of 37% hydrochloric acid maintaining the pH below 3. The solids are then allowed to settle, the supernatant layer is decanted off and the solids are reslurried with 1000 parts of water adding sufficient hydrochloric acid to adjust the pH to 3.0. The solids are again recovered by settling and decantation and the washing process is repeated twice more. A total of 423 parts of 37% hydrochloric acid is added during the recovery and washing steps.

The wet cake is then washed four times with acetone to displace the water and the acetone wet cake is dried overnight in a vacuum oven at 110–115° C.

The dried cake is screened through a 100 mesh screen to give 137 parts of a black powder having the composition by analysis, 88.75% tungsten, 5.5% carbon, 4.23% cobalt and 0.4% oxygen. The surface area by nitrogen absorption is 1.9 square meters per gram. X-ray diffraction shows a very strong pattern for WC with some weak lines corresponding to $W_2C$. The crystallite size of the tungsten carbide is calculated as 139 millimicrons from X-ray line broadening.

In the process as described in Example 1 instead of charging to the molten salt medium the cobalt oxide/tungstic oxide powder prepared by coprecipitation and firing, the following alternative charges are used to prepare a pulverulent mixture of cobalt and tungsten carbide similar to that prepared in Example 1.

To the molten calcium chloride is added a mixture of finely divided cobalt metal powder, tungstic oxide and carbon along with sufficient calcium to reduce the tungstic oxide. A mixture of cobalt oxide, tungstic oxide and carbon is also used as an alternative charge. Tungsten chlorides, $WCl_4$ and $WCl_6$ can be used instead of tungstic oxide.

Similarly, tungsten carbide can be first synthesized in the melt from tungstic oxide, carbon and calcium. Either cobalt metal, or cobalt oxide with sufficient additional calcium to reduce it to the metal can then be added to the stirred suspension of tungsten carbide in the melt.

In all of these processes the products are recovered by the procedure of Example 1.

I claim:

1. In a reduction process for making a pulverulent intimate mixture of tungsten carbide and cobalt wherein the tungsten carbide is prepared by reducing with metallic calcium a source of tungsten in molten calcium chloride in the presence of an amount of carbon sufficient to convert the tungsten to tungsten carbide, the improvement comprising admixing with the molten medium a source of cobalt.

2. The process of claim 1, in which the cobalt source is selected from the group consisting of cobalt metal, cobalt oxides, cobalt chloride, and the heat decomposable precursors of cobalt metal and cobalt oxides.

3. The process of claim 2 wherein the cobalt source, the tungsten source, and the carbon are added simultaneously to the molten calcium chloride.

4. The process of claim 3 wherein the source of cobalt is cobalt oxide and the source of tungsten is tungstic oxide.

5. The process of claim 4 wherein the cobalt oxide and tungstic oxide are added as a coprecipitate.

References Cited

UNITED STATES PATENTS

| | | | |
|---|---|---|---|
| 1,874,641 | 8/1932 | Sessions | 75—204 |
| 3,440,035 | 4/1969 | Iwase et al. | 75—108 |

L. DEWAYNE RUTLEDGE, Primary Examiner

T. R. FRYE, Assistant Examiner

U.S. Cl. X.R.

75—204